United States Patent [19]

Yatake

[11] Patent Number: 5,560,770
[45] Date of Patent: Oct. 1, 1996

[54] INK COMPOSITION FOR INK JET RECORDING

[75] Inventor: Masahiro Yatake, Suwa, Japan

[73] Assignee: Seiko Epson Corporation, Tokoyo-To, Japan

[21] Appl. No.: 328,892

[22] Filed: Oct. 25, 1994

[30] Foreign Application Priority Data

| Oct. 26, 1993 | [JP] | Japan | 5-267481 |
| Feb. 3, 1994 | [JP] | Japan | 6-011837 |
| Feb. 3, 1994 | [JP] | Japan | 6-011838 |
| May 11, 1994 | [JP] | Japan | 6-097678 |
| Aug. 24, 1994 | [JP] | Japan | 6-199749 |

[51] Int. Cl.$^6$ ................................. C09D 11/02
[52] U.S. Cl. ........................ 106/22 R; 106/200
[58] Field of Search ................. 106/22 R, 20 D

[56] References Cited

U.S. PATENT DOCUMENTS

| 5,156,675 | 10/1992 | Breton et al. | 106/22 R |
| 5,165,968 | 11/1992 | Johnson | 106/22 R |
| 5,376,169 | 12/1994 | Hotomi et al. | 106/20 C |
| 5,431,720 | 6/1995 | Nagai et al. | 106/22 H |
| 5,441,561 | 8/1995 | Chujo et al. | 106/22 B |

OTHER PUBLICATIONS

World Surface Coatings Abstracts, vol. 65, No. 599, 1992, Hill Hall GB p. 817 (no month available).

Primary Examiner—Helene Klemanski
Attorney, Agent, or Firm—Ladas & Parry

[57] ABSTRACT

An ink composition for an ink jet recording is provided which has excellent various properties, particularly can realize printing with less bleeding. The ink composition comprises a dye, propylene glycol mono-n-butyl ether (PGmBE) and/or dipropylene glycol mono-n-butyl ether (DPGmBE) and a water-soluble glycol ether other than PGmBE and DPGmBE, the total amount of PGmBE and DPGmBE being 3 to 30% by weight based on the ink composition.

18 Claims, 4 Drawing Sheets

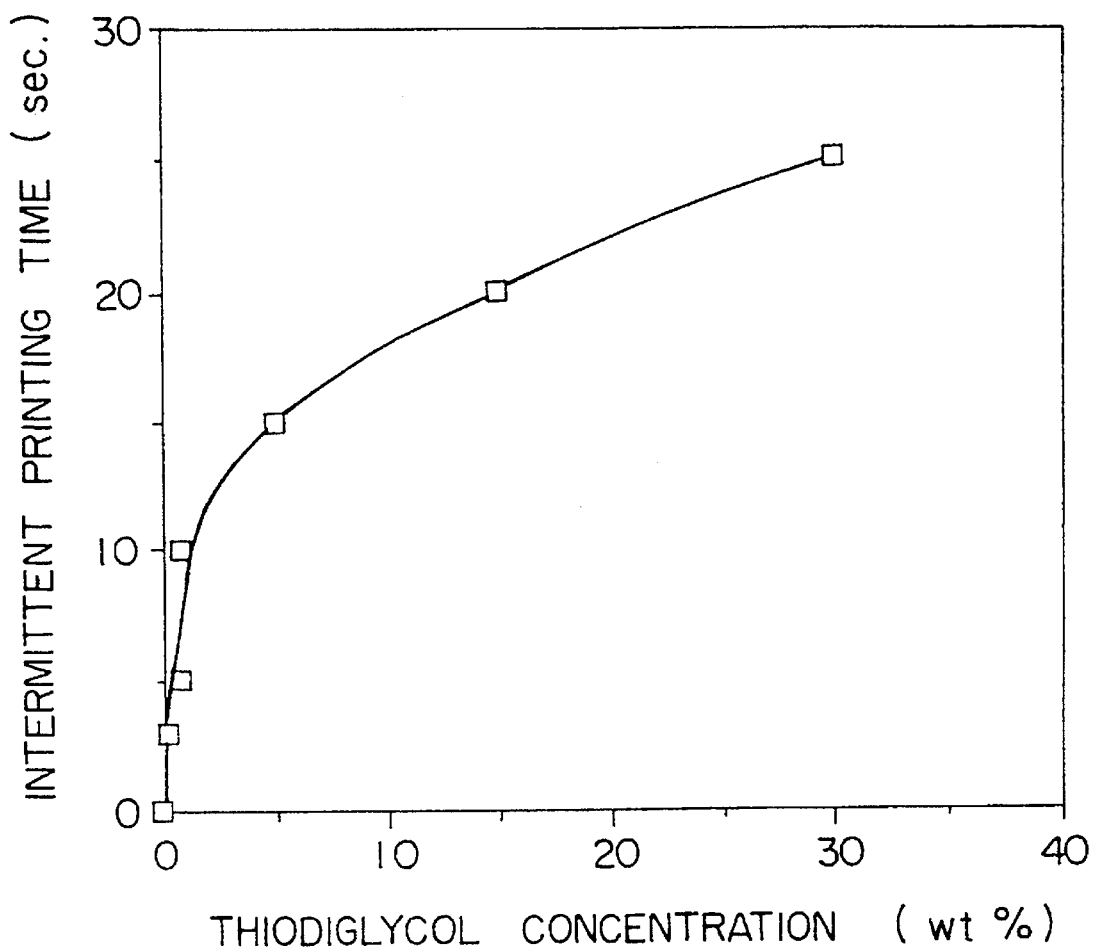
F I G. 4

INK COMPOSITION FOR INK JET RECORDING

BACKGROUND OF THE INVENTION

1. Technical Field

The present invention relates to an ink composition for ink jet recording.

2. Background Art

Various properties are required of ink compositions for ink jet recording. For example, ink compositions for ink jet recording should provide a print on various recording media without bleeding. In order to prevent bleeding, various ink compositions have hitherto been proposed in the art (for example, Japanese Patent Publication Nos. 2907/1990, 15542/1989 and 3837/1990).

Furthermore, a proposal has been made on the prevention of bleeding through an improvement in penetration of an ink composition. For example, U.S. Pat. No. 5,156,675 discloses an ink composition containing diethylene glycol monobutyl ether. U.S. Pat. No. 5,183,502 discloses an ink composition containing a surfactant. U.S. Pat. No. 5,196,056 discloses an ink composition containing diethylene glycol monobutyl ether and a surfactant. Diethylene glycol monobutyl ether is called "butylcarbitol" and disclosed in, for example, U.S. Pat. No. 3,291,580. U.S. Pat. No. 2,083,372 discloses an ink composition containing diethylene glycol ether.

According to the above ink compositions, although bleeding can be prevented to some extent, an ink composition, which is less likely to cause bleeding, has been desired in the art.

In recent years, recycled paper has become used from the viewpoint of environmental protection. The recycled paper comprises components of various types of paper. Thus, penetration of an ink composition into the recycled paper varies from component to component, which results in bleeding in the print. In order to prevent bleeding in the recycled paper, a method has been proposed wherein recording paper is heated at the time of printing. In this method, however, a certain period of time is required for the paper to be heated to a predetermined temperature. Furthermore, power consumption becomes high, which is not cost-effective. Moreover, there is a fear of the recording paper and print being deteriorated by heating.

The ink composition for ink jet recording should satisfy further property requirements including that it should provide a good print density and a long intermittent printing time and be stable and less likely to clogging of nozzles.

SUMMARY OF THE INVENTION

Accordingly, an object of the present invention is to provide an ink composition for ink jet recording which has various excellent properties, especially an ink composition for ink jet recording which can realize printing with less bleeding.

The ink composition for ink jet recording according to the present invention comprises a dye, propylene glycol mono-n-butyl ether (PGmBE) and/or dipropylene glycol mono-n-butyl ether (DPGmBE) and a water-soluble glycol ether other than PGmBE and DPGmBE, the amount of PGmBE and DPGmBE being 3 to 30% by weight based on the ink composition.

BRIEF DESCRIPTION OF THE DRAWINGS

FIG. 4 is a graph showing the intermittent printing times of ink compositions comprising the same components as the ink composition of Example D1 except that the thiodiglycol concentration was varied.

DETAILED DESCRIPTION OF THE INVENTION

Figure 1:
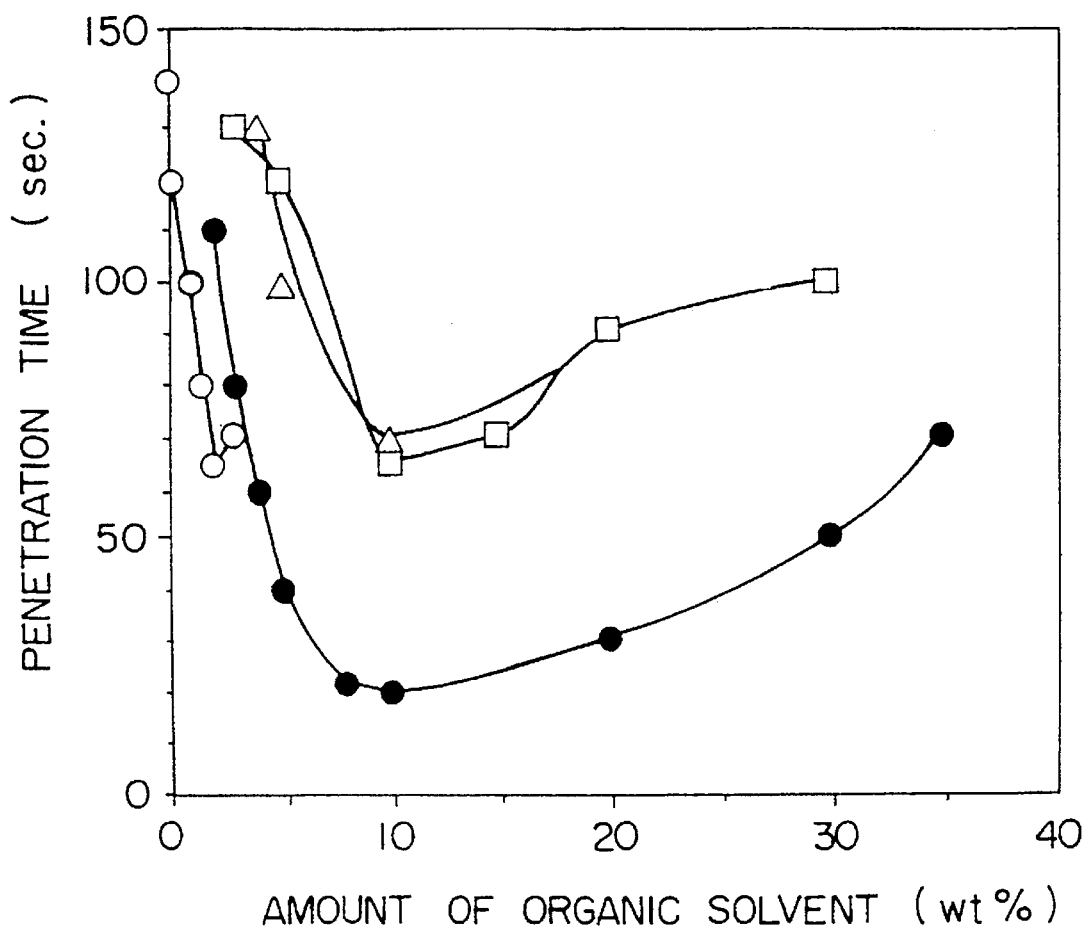
FIG. 1 is a graph showing the penetration times of ink compositions wherein ● represents the penetration times of ink compositions comprising the same components as the ink composition of Example A1 except that the amounts of diethylene glycol monoethyl ether and 1,4-butanediol added as organic solvents were varied in the range of from 2 to 35% with the ratio of diethylene glycol monoethyl ether to 1,4-butanediol being maintained at 2:1; ○, □ and △ represent the penetration times of ink compositions having the comprising the same components as the ink composition of Example A1 except that 10% Surfynol 465, 10% diethylene glycol mono-n-ethyl ether and 1% Surfynol 465 were used instead of 10% PGmBE, respectively, and the amounts of diethylene glycol monoethyl ether and 1,4-butanediol added were varied with the ratio of diethylene glycol monoethyl ether to 1,4-butanediol being maintained at 2:1.

The ink composition of the present invention comprises PGmBE and/or DPGmBE in a total amount of 3 to 30% by weight, preferably 5 to 10% by weight, based on the ink composition. The content of PGmBE and DPGmBE within the range can effectively prevent bleeding of the ink on recording paper.

The ink composition of the present invention may comprise a water-soluble glycol ether in addition to PGmBE and/or DPGmBE.

Without intending to be bound by the following theory, it is believed that a combination of PGmBE and/or DPGmBE with a water-soluble glycol either enables the above amount of PGmBE and DPGmBE to be realized. PGmBE and DPGmBE has only a limited solubility in water. According to studies of the present inventors, for example, when PGmBE and DPGmBE are used alone, the solubility thereof in water is 5 to 6%, whereas the presence of other components of the ink composition, such as dyes, lowers the solubility to less than about 2%. However, the addition of a water-soluble glycol ether to the system enables the above amount of PGmBE and DPGmBE to be realized. In addition, various properties of the ink composition can be improved. More specifically, for example, prints free from bleeding can be provided.

Preferred examples of the water-soluble glycol include ethylene glycol monoalkyl ethers, diethylene glycol monoalkyl ethers, triethylene glycol monoalkyl ethers, propylene glycol monoalkyl ethers, dipropylene glycol monoalkyl ethers and alkoxy-substituted aliphatic alcohols. Still preferred examples thereof include ethylene glycol mono-$C_{1-6}$alkyl ethers, diethylene glycol mono-$C_{1-6}$alkyl ethers, triethylene glycol mono-$C_{1-6}$alkyl ethers, propylene glycol mono-$C_{1-6}$alkyl ethers, dipropylene glycol mono-$C_{1-6}$alkyl ethers and $C_{1-6}$alkoxy-substituted $C_{1-6}$aliphatic alcohols. Specific examples of the water-soluble glycols include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, ethylene glycol mono-t-butyl ether, diethylene glycol mono-t-butyl ether, triethylene glycol monobutyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether and dipropylene glycol mono-iso-propyl ether.

The water-soluble glycol ether may be added in any amount so far as the ink penetration rate is sufficient and PGmBE and DPGmBE are not subjected to phase separation. The amount of the water-soluble glycol ether added, however, is preferably in the range of from 5 to 60% by weight, still preferably in the range of from 5 to 15% by weight, based on the ink composition.

Further, according to a preferred embodiment of the present invention, the water-soluble glycol ether is preferably added in an amount of not less than 0.5% by weight, still preferably 0.8 to 3% by weight, based on the total amount of PGmBE and DPGmBE. The amount of the water-soluble glycol ether within the range improves the dissolution stability of PGmBE and DPGmBE. At the same time, it is possible to prevent the occurrence of such a phenomenon that part of oil-soluble components contained in the ink composition bleeds on the periphery of a print on a recording medium. Furthermore, the odor of glycol ether can be reduced.

According to a further preferred embodiment of the present invention, the ink composition of the present invention may contain urea and/or a urea derivative. The addition of the urea and/or urea derivative can surprisingly improve print density and prevent clogging of ink delivery ports. Examples of the urea derivative include ethyleneurea, thiourea, biurea, biuret or tetramethylurea. The amount of the urea and/or urea derivative added can be freely determined so far as the print density of the ink composition can be improved and, at the same time, clogging of nozzles can be effectively prevented. It, however, is preferably in the range of from 2 to 20% by weight, still preferably in the range of from 5 to 10% by weight, based on the ink composition.

According to a further preferred embodiment of the present invention, the ink composition of the present invention may further comprise thioglycol. The addition of thioglycol surprisingly enables the intermittent printing time to be prolonged. The term "intermittent printing time" used herein is intended to mean the period of time for which the ink can remain undelivered without causing any unfavorable phenomena, such as clogging, in the subsequent resumption of printing. In ink jet recording printers, the ink is delivered at given time intervals for the purpose of preventing nozzles from being clogged due to drying of the vicinity of the nozzles. This operation is generally called "flushing." The ink composition having a long intermittent printing time can prolong the time interval for flushing. This can advantageously avoid wasting the ink composition and, at the same time, increase the printing speed. Moreover, the addition of thioglycol is advantageous also from the viewpoint of improving the stability of the ink composition.

According to a further preferred embodiment of the present invention, the ink composition of the present invention may further comprise a surfactant. The addition of the surfactant may improve properties of the ink composition, such as the intermittent printing time. Preferred examples of the surfactant include anionic surfactants, amphoteric surfactants, cationic surfactants and nonionic surfactants. Examples of the anionic surfactant include alkylsulfocarbonates, α-olefinsulfonates, polyoxyethylene alkyl ether acetates, N-acylamino acid and its salts, N-acylmethyltaurine salts, alkylsulfate polyoxyalkyl ether sulfates, alkylsulfate polyoxyethylene ether phosphates, rosin soap, castor oil sulfates, lauryl alcohol sulfates, alkylphenol phosphates, alkyl phosphates, alkylallylsulfonates, diethylsulfosuccinates, diethylhexylsulfosuccinates and dioctylsulfosuccinates. Examples of the cationic surfactant include 2-vinylpyridine derivatives and poly(4-vinylpyridine) derivatives. Examples of the amphoteric surfactant include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine and other imidazoline derivatives. Examples of the nonionic surfactant include ether nonionic surfactants such as polyoxyethylene nonylphenyl ether, polyoxyethylene octylphenol ether, polyoxyethylene dodecylphenyl ether, polyoxyethylene alkylallyl ether, polyoxyethylene oleyl ether, polyoxyethylene lauryl ether, polyoxyethylene alkyl ethers and polyoxyalkylene alkyl ether; ester nonionic surfactants such as polyoxyethyleneoleic acid, polyoxyethyleneoleic acid esters, polyoxyethylenedistearic acid esters, sorbitan laurate, sorbitan monostearate, sorbitan monooleate, sorbitan sesquioleate, polyoxyethylene monooleate and polyoxyethylene stearate; acetyl glycol nonionic surfactants such as 2,4,7,9-tetramethyl-5-decyn-4,7-diol, 3,6-dimethyl-4-octyn-3,6-diol, 3,5-dimethyl-1-hexyn-3-ol, for example, Surfynol 104, 82, 465, and TG manufactured by Nisshin Chemical Industry Co., Ltd.; and fluorosurfactants such as fluorine-substituted alky esters and perfluoroalkylcarboxylates, for example, Ftergent series manufactured by Neos Co., Ltd., Lodyne series manufactured by Chiba-Geigy Limited, Japan, Zonyl series manufactured by Du Pont Kabushiki Kaisha, Mortflor series manufactured by ICI, Surfluon series manufactured by Asahi Glass Co., Ltd., Unidyne series manufactured by Daikin Industries, Ltd. and FC series manufactured by Sumitomo 3M Ltd. Fluorosurfactants, particularly amphoteric or nonionic surfactants are especially preferably used. While the amount of the surfactant added may be freely determined, for the fluorosurfactant, the amount is preferably about 1 to 10,000 ppm.

According to a further preferred embodiment, the ink composition of the present invention may further comprise a water-soluble organic solvent. Examples of the water-soluble organic solvent include akyl alcohols having 1 to 4 carbon atoms such as ethanol, methanol, butanol, propanol and isopropanol; polyhydric alcohols or glycols such as ethylene glycol, diethylene glycol, triethylene glycol, polyethylene glycol having a molecular weight of not more than 600, propylene glycol, dipropylene glycol, tripropylene glycol, polypropylene glycol having a molecular weight of not more than 400, 1,3-butylene glycol, 1,3-propanediol, 1,4-butanediol, 1,5-pentanediol, 1,6-hexanediol, thiodiglycol, glycerin, meso-erythritol and pentaerythritol; formamide, acetamide; dimethyllsulfoxide; sorbitol; sorbitan; acetin; diacetin; triacetin and sulfolane.

Further, the ink composition of the present invention may contain various additives for the purpose of improving various properties of the ink composition. Examples of the additive include antiseptic agents, mildewproofing agents, pH adjustors and viscosity modifiers. Specific examples of the antiseptic and mildewproofing agents include sodium benzoate, sodium pentachlorophenol, sodium 2-pyridinethiol-1-oxide, sodium sorbicate, sodium dehydroacetate and 1,2-dibenzothiazolin- 3-one (Proxel CRL, Proxel BDN, Proxel GXL, Proxel XL-2 and Proxel TN manufactured by ICI).

Examples of the pH adjustor include amines such a diethanolamine, triethanolamine, propanolamine and morpholine; inorganic salts such as potassium hydroxide, sodium hydroxide and lithium hydroxide; ammonium hydroxide; quaternary ammonium hydroxide such as tetramethylammonium; carbonates and phosphates such as potassium carbonate, sodium carbonate and lithium carbonate; N-methyl-2-pyrrolidone; ureas such as urea, tiourea and tetramethylurea; allophanates such as allophanate and methyl allophanate; and biurets such as biuret, dimethylbiuret and tetramethylbiuret.

Examples of the viscosity adjustor include polyvinyl alcohol, hydroxypropyl cellulose, hydroxyethyl cellulose, methyl cellulose, polyacrylates, polyvinylpyrrolidone and gum arabic starchi.

The colorants usable in the ink composition of the present invention include, but not limited to, direct dyes, acid dyes, basic dyes, reactive dyes and food dyes.

Specific preferred examples of the direct dye include C.I. Direct Black 2, 4, 9, 11, 14, 17, 19, 22, 27, 32, 36, 41, 48, 51, 56, 62, 71, 74, 75, 77, 78, 80, 105, 106, 107, 108, 112, 113, 117, 132, 146, 154, 168, 171 and 194, C.I. Direct Yellow 1, 2, 4, 8, 11, 12, 24, 26, 27, 28, 33, 34, 39, 41, 42, 44, 48, 50, 51, 58, 72, 85, 86, 87, 88, 98, 100, 110, 127, 135, 141, 142 and 144, C.I. Direct Orange 6, 8, 10, 26, 29, 39, 41, 49, 51, 62 and 102, C.I. Direct Red 1, 2, 4, 8, 9, 11, 13, 15, 17, 20, 23, 24, 28, 31, 33, 37, 39, 44, 46, 47, 48, 51, 59, 62, 63, 73, 75, 77, 79, 80, 81, 83, 84, 85, 87, 89, 90, 94, 95, 99, 101, 108, 110, 145, 189, 197, 224, 225, 226, 227, 230, 250, 256 and 257, C.I. Direct Violet 1, 7, 9, 12, 35, 48, 51, 90 and 94, C.I. Direct Blue 1, 2, 6, 8, 12, 15, 22, 25, 34, 69, 70, 71, 72, 75, 76, 78, 80, 81, 82, 83, 86, 97, 90, 98, 106, 108, 110, 120, 123, 158, 163, 165, 192, 193, 194, 195, 196, 199, 200, 201, 202, 203, 207, 218, 236, 237, 239, 246, 258 and 287, C.I. Direct Green 1, 6, 8, 28, 33, 37, 63 and 64, and C.I. Direct Brown 1A, 2, 6, 25, 27, 44, 58, 95, 100, 101, 106, 112, 173, 194, 195, 209, 210 and 211.

Examples of the acid dye include C.I. Acid Black 1, 2, 7, 16, 17, 24, 26, 28, 31, 41, 48, 52, 58, 60, 63, 94, 107, 109, 112, 118, 119, 121, 122, 131, 155 and 156, C.I. Acid Yellow 1, 3, 4, 7, 11, 12, 13, 14, 17, 18, 19, 23, 25, 29, 34, 36, 38, 40, 41, 42, 44, 49, 53, 55, 59, 61, 71, 72, 76, 78, 79, 99, 111, 114, 116, 122, 135, 142, 161 and 172, C.I. Acid Orange 7, 8, 10, 19, 20, 24, 28, 33, 41, 45, 51, 56 and 64, C.I. Acid Red 1, 4, 6, 8, 13, 14, 15, 18, 19, 21, 26, 27, 30, 32, 34, 35, 37, 40, 42, 44, 51, 52, 54, 57, 80, 82, 83, 85, 87, 88, 89, 92, 94, 97, 106, 108, 110, 111, 114, 115, 119, 129, 131, 134, 135, 143, 144, 152, 154, 155, 172, 176, 180, 184, 186, 187, 249, 254, 256, 289, 317 and 318, C.I. Acid Violet 7, 11, 15, 34, 35, 41, 43, 49, 51 and 75, C.I. Acid Blue 1, 7, 9, 15, 22, 23, 25, 27, 29, 40, 41, 43, 45, 51, 53, 55, 56, 59, 62, 78, 80, 81, 83, 90, 92, 93, 102, 104, 111, 113, 117, 120, 124, 126, 138, 145, 167, 171, 175, 183, 229, 234, 236 and 249, C.I. Acid Green 3, 9, 12, 16, 19, 20, 25, 27, 41 and 44, and. C.I. Acid Brown 4 and 14.

Examples of the basic dye include C.I. Basic Black 2 and 8, C.I. Basic Yellow , 2, 11, 14, 21, 32 and 36, C.I. Basic Orange 2, 15, 21 and 22, C.I.: Basic Red 1, 2, 9, 12, 13 and 37, C.I. Basic Violet 1, 3, 7, 10 and 14, C.I. Basic Blue 1, 3, 5, 7, 9, 24, 25, 26, 28 and 29, C.I. Basic Green 1 and 4, and C.I. Basic Brown 1 and 12.

Examples of the reactive dye include C.I. Reactive Black 1, 3, 5, 6, 8, 12 and 14, C.I. Reactive Yellow 1, 2, 3, 12, 13, 14, 15 and 17, C.I. Reactive Orange 2, 5, 7, 16, 20 and 24, C.I. Reactive Red 6, 7, 11, 12, 15, 17, 21, 23, 24, 35, 36, 42, 63, 66, 84 and 184, C.I. Reactive Violet 2, 4, 5, 8 and 9, C.I. Reactive Blue 2, 5, 7, 12, 13, 14, 15, 17, 18, 19, 20, 21, 25, 27, 28, 37, 38, 40 and 41, C.I. Reactive Green 5 and 7, and C.I. Reactive Brown 1, 7 and 16.

Examples of the food dye include C.I. Food Black 1 and 2, C.I. Food Yellow 3, 4 and 5, C.I. Food Red 2, 3, 7, 9, 14, 52, 87, 92, 94, 102, 104, 105 and 106, C.I. Food Violet 2, C.I. Food Blue 1 and 2, and C.I. Food Green 2 and 3.

Further, it is also possible to utilize Kayaset Black 009A, Direct Deep Black XA and Direct Special Black AXN manufactured by Nippon Kayaku Co., Ltd., Special Black SP Liquid, Bayscript Black SP Liquid, Levacell Turquoise Blue KS- 6GLL and Pyranine manufactured by Bayer Japan Ltd., JI. BK-2 and JI. BK-3 manufactured by Sumitomo Chemical Co., Ltd., JPK- 81L, JPX-127L, JPK-139 and C.I. Fluorescent Brightening Agent 14, 22, 24, 32, 84, 85, 85, 87, 90, 134, 166, 167, 169, 175, 176 and 177 manufactured by Orient Chemical Industries, Ltd.

Various properties of the ink composition according to the present invention can be properly determined so as to be suitable for ink jet recording. In this context, it is preferred to take into consideration particularly the foaming property, surface tension and forward contact angle thereof with nozzle face of an ink jet recording head. More specifically, the foamability of the ink composition as measured at 15° C. by the Ross-Miles test is not more than 200 mm as the initial value and not more than 100 mm 5 min after the initiation of the test. The Ross-Miles test is a foamability test wherein 200 ml of a test solution is fallen down from a height of 90 cm through a small tube of 29 mm inner diameter into a graduated tube of 50 mm inner diameter containing 50 ml of the test solution to determine the height of the resultant foam. The initial value and the value 5 min after the initiation of the test within the above range can prevent the occurrence of foam in an ink passage and an recording head. Thus, the ink composition can be easily filled into nozzles, which enables dropout and other unfavorable phenomena to be effectively prevented. The surface tension of the ink composition is preferably in the range of from 15 to 40 mN/m at the temperatures at which the ink composition is used for ink jet recording. When the surface tension falls within the above range, the ink composition can be easily filled into nozzles. Moreover, at the same time, a print having a good quality can be provided. The contact angle of the ink composition to the nozzle plate of the recording head is preferably in the range of from 10° to 50°. When the contact angle falls within the range, the ink composition can homogeneously wet nozzle faces, so that a print having a good quality can be provided. Further, this provides an advantage that the intermittent printing time can be prolonged.

The ink composition of the present invention can be produced by the conventional method. Specifically, the above components are sufficiently stirred, and mixed together, optionally filtered to remove solid matter, thereby preparing an ink composition.

EXAMPLES

The present invention will now be described in more detail with reference to the following examples, though it is not limited to these examples only.

In the following examples, printing was carried out using an ink jet printer MJ-500 manufactured by Seiko Epson Corporation, unless otherwise noted.

Furthermore, "%" is by weight unless otherwise noted. Moreover, the ink composition other than those of Example A and Comparative Example A contain 0.1 to 1% of Proxel XL-2 as corrosion inhibitor and 0.001 to 0.005% of benzotriazole for preventing the corrosion of recording head members.

Example A

Ink compositions of Examples A1 to A8 and Comparative Examples A1 to A3 were prepared by the conventional method. Specifically, the following ingredients were stirred and mixed together, and the mixture was filtered to prepare an ink composition.

Example A1

| | |
|---|---|
| C.I. Direct Black 19 | 2% |
| PGmBE | 10% |
| Diethylene glycol monoethyl ether | 10% |
| 1,4-Butanediol | 5% |
| Sodium dioctylsulfosuccinate | 1.5% |
| Water | Balance |

Example A2

| | |
|---|---|
| C.I. Food Black 19 | 2.5% |
| PGmBE | 10% |
| Diethylene glycol mono-n-butyl ether | 10% |
| Dipropylene glycol | 5% |
| Proxel GXL | 0.3% |
| Water | Balance |

Example A3

| | |
|---|---|
| C.I. Acid Green 9 | 2.5% |
| PGmBE | 10% |
| 1-Methyl-1-methoxy butanol | 15% |
| Diethylene glycol | 5% |
| Water | Balance |

Example A4

| | |
|---|---|
| Special Black SP liquid | 20% |
| DPGmBE | 10% |
| Propylene glycol monoethyl ether | 10% |
| 1,3-Dimethyl-2-imidazolidinone | 5% |
| Water | Balance |

Example A5

| | |
|---|---|
| Direct Special Black AXN | 4% |
| PGmBE | 9% |
| Dipropylene glycol monomethyl ether | 12% |
| N-Methyl pyrrolidone | 5% |
| Water | Balance |

Example A6

| | |
|---|---|
| C.I. Reactive Red 6 | 4% |
| PGmBE | 9% |
| DPGmBE | 5% |
| Diethylene glycol mono-n-butyl ether | 15% |
| N-Acyl methyl taurine sodium | 1.5% |
| Water | Balance |

Example A7

| | |
|---|---|
| C.I. Basic Yellow 11 | 5% |
| PGmBE | 10% |
| Triethylene glycol monobutyl ether | 12% |
| Glycerin | 10% |
| Surfynol 465 | 1% |
| Surfynol 104 | 0.5% |
| Water | Balance |

Example A8

| | |
|---|---|
| C.I. Direct Green 1 | 3% |
| C.I. Direct Green 28 | 1% |
| PGmBE | 10% |
| Diethylene glycol mono-t-butyl ether | 5% |
| Diethylene glycol mono-n-butyl ether | 5% |
| Diethylene glycol | 10% |
| Propylene glycol monomethyl ether | Balance |

Comparative Example A1

| | |
|---|---|
| C.I. Direct Green 1 | 3% |
| Diethylene glycol mono-n-butyl ether | 5% |
| Tetraethylene glycol | 15% |
| Potassium hydroxide | 0.1% |
| Water | Balance |

Comparative Example A2

| | |
|---|---|
| C.I. Direct Red 227 | 2.5% |
| Diethylene glycol mono-n-butyl ether | 15% |
| Triethylene glycol | 5% |
| Glycerin | 10% |
| Water | Balance |

Comparative Example A3

| | |
|---|---|
| C.I. Acid Red 254 | 2.5% |
| Diethylene glycol mono-n-butyl ether | 7% |
| Diethylene glycol | 15% |
| Water | Balance |

Evaluation Test A1

The above ink compositions were used to carry out printing on various types of recording paper specified in Table 1. The prints thus obtained were evaluated as follows.

Bleeding

The circularity of dots was evaluated according to the following criteria as a measure of penetration of the ink wherein uneven penetration of the ink gave rise to a lowering in circularity of the dots.

⊚: Very good circularity;

○: Slightly lowered circularity which causes no problem for practical use;

△: Lowered circularity which causes a problem for practical use; and

X: Remarkably lowered circularity which renders the ink unsuitable for practical use.

Feathering

Uneven penetration of an ink along paper fiber, i.e., feathering, was evaluated according to the following criteria.

◎: Little or no feathering with very even penetration;

○: Slight feathering which causes no problem for practical use;

△: Many feathering which causes a problem for practical use; and

X: Remarkable feathering which renders the ink unsuitable for practical use.

The results were as given in the following Table 1.

the ratio of diethylene glycol monoethyl ether to 1,4-butanediol being maintained at 2:1. One (1) μl of the ink composition was dropped in a spot form on DERSCHER paper. The time taken for drying the ink spot was measured as a penetration time. The results are indicated as ● in FIG. 1.

Further, in the ink composition prepared in Example A1, 10% Surfynol 465 was used instead of 10% PGmBE, and the amounts of diethylene glycol monoethyl ether and 1,4-butanediol added as organic solvents were varied with the ratio of diethylene glycol monoethyl ether to 1,4-butanediol being maintained at 2:1. The penetration time of the ink composition was measured in the same manner as described above. The results are indicated as ○ in FIG. 1. Moreover, in the ink composition prepared in Example A1, 10% diethylene glycol mono-n-butyl ether and 1% Surfynol 465 were used instead of 10% PGmBE, respectively, and the amounts of diethylene glycol monoethyl ether and 1,4-butanediol added as organic solvents were varied with the

TABLE 1

| Test item | Type of paper | Ex. A 1 | 2 | 3 | 4 | 5 | 6 | 7 | 8 | Comp. Ex. A 1 | 2 | 3 |
|---|---|---|---|---|---|---|---|---|---|---|---|---|
| Bleeding | CONQUEROR Paper | ◎ | ◎ | ◎ | ◎ | ◎ | ◎ | ◎ | ◎ | ○ | ◎ | ○ |
| | FAVORIT X Paper | ◎ | ◎ | ◎ | ◎ | ◎ | ◎ | ◎ | ◎ | △ | ○ | ○ |
| | MODO COPY Paper | ◎ | ◎ | ○ | ◎ | ○ | ◎ | ◎ | ◎ | X | △ | X |
| | RAPID COPY Paper | ◎ | ◎ | ◎ | ◎ | ◎ | ◎ | ◎ | ◎ | △ | ○ | ○ |
| | EPSON EPP Paper | ◎ | ◎ | ◎ | ◎ | ◎ | ◎ | ◎ | ◎ | X | △ | X |
| | XEROX P Paper | ◎ | ◎ | ◎ | ◎ | ◎ | ◎ | ◎ | ◎ | X | △ | X |
| | XEROX 4024 Paper | ◎ | ◎ | ◎ | ◎ | ◎ | ◎ | ◎ | ◎ | △ | ○ | △ |
| | XEROX 10 Paper | ◎ | ◎ | ◎ | ◎ | ◎ | ◎ | ◎ | ◎ | △ | △ | △ |
| | NEENACH BOND Paper | ◎ | ◎ | ○ | ◎ | ○ | ◎ | ◎ | ◎ | X | △ | △ |
| | RICOPY 6200 Paper | ◎ | ◎ | ◎ | ◎ | ◎ | ◎ | ◎ | ◎ | △ | △ | △ |
| | Yamayuri Paper | ◎ | ◎ | ○ | ◎ | ○ | ◎ | ◎ | ◎ | X | X | X |
| | XEROX R Paper | ◎ | ◎ | ○ | ◎ | ○ | ◎ | ◎ | ○ | X | X | X |
| Feathing | CONQUEROR Paper | ◎ | ◎ | ◎ | ◎ | ◎ | ◎ | ◎ | ◎ | X | △ | X |
| | FAVORIT X Paper | ◎ | ◎ | ◎ | ◎ | ◎ | ◎ | ◎ | ◎ | △ | △ | △ |
| | MODO COPY Paper | ◎ | ◎ | ◎ | ◎ | ◎ | ◎ | ◎ | ◎ | △ | △ | △ |
| | RAPID COPY Paper | ◎ | ◎ | ◎ | ◎ | ◎ | ◎ | ◎ | ◎ | X | △ | △ |
| | XEROX P Paper | ◎ | ◎ | ◎ | ◎ | ◎ | ◎ | ◎ | ◎ | X | △ | X |
| | XEROX 4024 Paper | ◎ | ◎ | ◎ | ◎ | ◎ | ◎ | ◎ | ◎ | X | X | X |
| | RICOPY 6200 Paper | ◎ | ◎ | ◎ | ◎ | ◎ | ◎ | ◎ | ◎ | X | △ | △ |
| | Yamayuri Paper | ◎ | ◎ | ◎ | ○ | ◎ | ○ | ○ | ◎ | X | X | X |
| | XEROX R Paper | ◎ | ◎ | ○ | ◎ | ○ | ◎ | ◎ | ○ | X | X | X |

The recording papers specified in the table are available from the following companies.

CONQUEROR Paper: Arjo Wigging Co., Ltd.
FAVORIT X Paper: Favorit Co., Ltd.
MODO COPY Paper: Mode Co., Ltd.
RAPID COPY Paper: Igepa Co., Ltd.
EPSON EPP Paper: Seiko Epson Corporation
XEROX P Paper: Fuji Xerox Co., Ltd.
XEROX 4024 Paper: Xerox Corp.
XEROX 10 Paper: Xerox Corp.
NEENACH BOND Paper: Kimberly-Clark Co., Ltd.
RICOPY 6200 Paper: Ricoh Co., Ltd.
Yamayuri Paper: Honshu Paper Co., Ltd.
XEROX R Paper: Xerox Corp.

Evaluation Test A2

In the ink composition prepared in Example A1, the amounts of diethylene glycol monoethyl ether and 1,4-butanediol added as organic solvents were varied in the range of from 2 to 35% (an increase or a decrease in the amount of the organic solvents was balanced by water) with ratio of diethylene glycol monoethyl ether to 1,4-butanediol being maintained at 2:1. The penetration time of the ink composition was measured in the same manner as described above. The results are indicated as □ and △ in FIG. 1.

Evaluation Test A3

Figure 2:
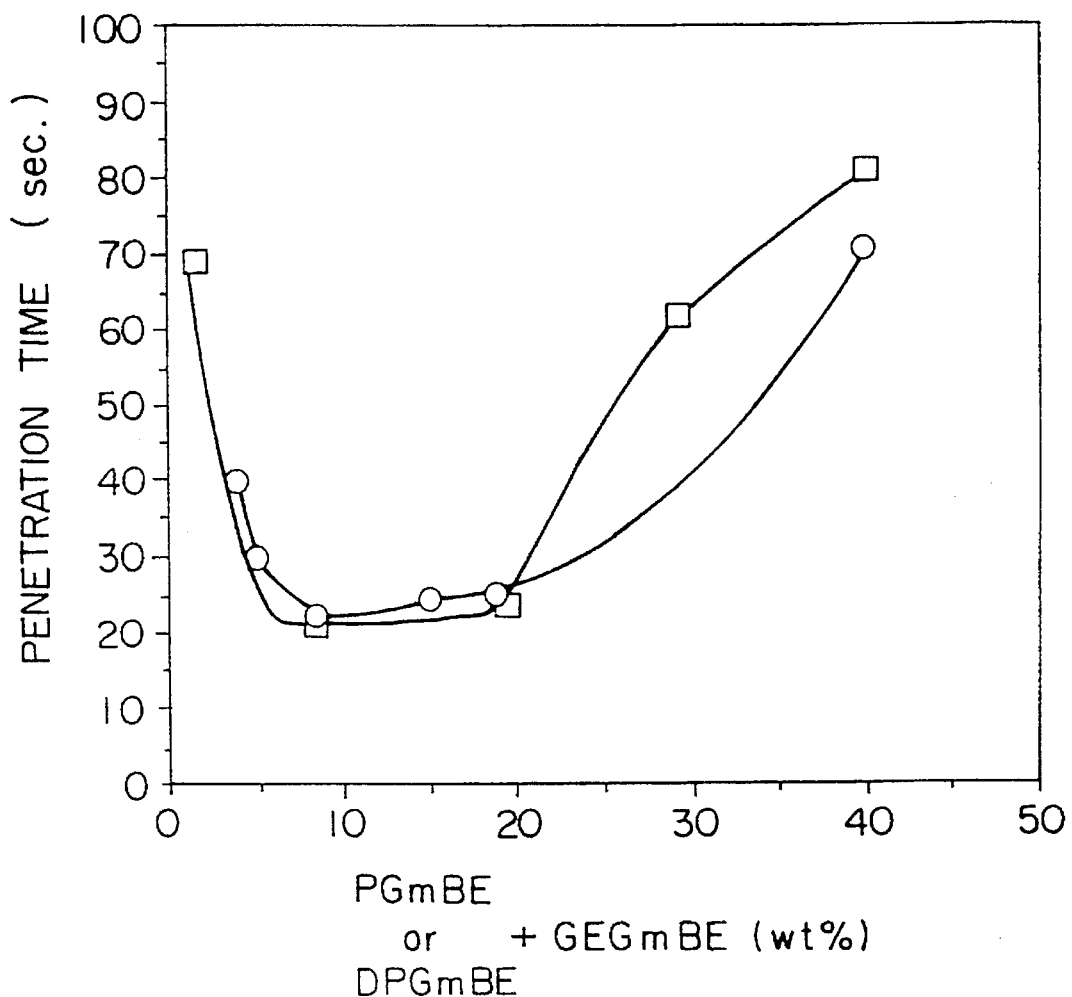
FIG. 2 is a graph showing the penetration times of ink compositions wherein □ represents the penetration times of ink compositions comprising the same components as the ink composition of Example A1 except that the amounts of diethylene glycol monoethyl ether and PGmBE added were varied with the ratio of diethylene glycol monoethyl ether to PGmBE being maintained at 1:1 and △ represents the penetration times of ink compositions comprising the same components as the ink composition of Example A1 except that DPGmBE was used instead of PGmBE.

In the ink composition prepared in Example A1, the amounts of PGmBE and diethylene glycol monoethyl ether added were varied with the ratio of PGmBE to diethylene glycol monoethyl ether being maintained at 1:1. The penetration time of the ink composition was measured in the same manner as in Evaluation test A2. The results are indicated as □ in FIG. 2.

Further, the penetration time of the ink composition was measured in the same manner as described above, except that DPGmBE was used instead of PGmBE. The results are indicated as ○ in FIG. 2.

Example B

Ink compositions of Examples B1 to B8 and Comparative Examples B1 to B3 were prepared by the conventional method.

Example B1

| C.I. Direct Black 19 | 2% |
|---|---|
| PGmBE | 10% |
| Diethylene glycol monoethyl ether | 10% |
| 1,4-Butanediol | 5% |
| Urea | 5% |
| Dipropylene glycol | 5% |
| Water | Balance |

Example B2

| C.I. Food Black 2 | 2.5% |
|---|---|
| PGmBE | 10% |
| Diethylene glycol mono-n-butyl ether | 10% |
| Dipropylene glycol | 5% |
| Urea | 10% |
| Proxel GXL | 0.3% |
| Water | Balance |

Example B3

| C.I. Acid Green 9 | 2.5% |
|---|---|
| PGmBE | 10% |
| 1-Methyl-1-methoxy butanol | 15% |
| Urea | 7% |
| Diethylene glycol | 5% |
| Water | Balance |

Example B4

| Special Black SP liquid | 20% |
|---|---|
| DPGmBE | 10% |
| Propylene glycol monoethyl ether | 10% |
| 1,3-Dimethyl-2-imidazolidinone | 5% |
| Thiourea | 5% |
| Water | Balance |

Example B5

| Direct Special Black AXN | 4% |
|---|---|
| PGmBE | 9% |
| Dipropylene glycol monomethyl ether | 12% |
| N-Methyl pyrrolidone | 5% |
| Ethyleneurea | 5% |
| Water | Balance |

Example B6

| C.I. Reactive Red 6 | 4% |
|---|---|
| PGmBE | 9% |
| DPGmBE | 5% |
| Diethylene glycol mono-n-butyl ether | 15% |
| N-Acylmethyltaurine sodium | 1.5% |
| Biurea | 3% |
| Water | Balance |

Example B7

| C.I. Basic Yellow 11 | 5% |
|---|---|
| PGmBE | 10% |
| Triethylene glycol monobutyl ether | 12% |
| Glycerin | 10% |
| Surfynol 465 | 1% |
| Surfynol 104 | 0.5% |
| Biuret | 3% |
| Water | Balance |

Example B8

| C.I. Direct Green 1 | 3% |
|---|---|
| C.I. Direct Green 28 | 1% |
| PGmBE | 10% |
| Diethylene glycol mono-t-butyl ether | 5% |
| Diethylene glycol mono-n-butyl ether | 5% |
| Diethylene glycol | 10% |
| Tetramethylurea | 3.5% |
| Propylene glycol monomethyl ether | Balance |

Comparative Example B1

| C.I. Direct Green 8 | 3% |
|---|---|
| C.I. Direct Green 1 | 1% |
| Diethylene glycol mono-n-butyl ether | 5% |
| Tetraethylene glycol | 15% |
| Potassium hydroxide | 0.1% |
| Water | Balance |

Comparative Example B2

| C.I. Direct Red 227 | 2.5% |
|---|---|
| Diethylene glycol mono-n-butyl ether | 15% |
| Triethylene glycol | 5% |
| Glycerin | 10% |
| Water | Balance |

Comparative Example B3

| C.I. Acid Red 254 | 2.5% |
|---|---|
| Diethylene glycol mono-n-butyl ether | 7% |
| Diethylene glycol | 15% |
| Water | Balance |

Evaluation Test B1

The above ink compositions were used to carry out printing on various types of recording paper specified in Table 2. The prints thus obtained were evaluated in the same manner as was described in Evaluation Test A1.

The results were as given in Table 2.

TABLE 2

| Test item | Type of paper | Ex. B 1 | 2 | 3 | 4 | 5 | 6 | 7 | 8 | Comp. Ex. B 1 | 2 | 3 |
|---|---|---|---|---|---|---|---|---|---|---|---|---|
| Bleeding | CONQUEROR Paper | ⊚ | ⊚ | ⊚ | ⊚ | ⊚ | ⊚ | ⊚ | ⊚ | ○ | ⊚ | ○ |
| | FAVORIT X Paper | ⊚ | ⊚ | ⊚ | ⊚ | ⊚ | ⊚ | ⊚ | ⊚ | △ | ○ | ○ |

TABLE 2-continued

| Test item | Type of paper | Ex. B 1 | 2 | 3 | 4 | 5 | 6 | 7 | 8 | Comp. Ex. B 1 | 2 | 3 |
|---|---|---|---|---|---|---|---|---|---|---|---|---|
| Feathring | MODO COPY Paper | ⊙ | ⊙ | ○ | ⊙ | ○ | ⊙ | ⊙ | ⊙ | X | Δ | X |
| | RAPID COPY Paper | ⊙ | ⊙ | ⊙ | ⊙ | ⊙ | ⊙ | ⊙ | ⊙ | Δ | ○ | ○ |
| | EPSON EPP Paper | ⊙ | ⊙ | ⊙ | ⊙ | ⊙ | ⊙ | ⊙ | ⊙ | X | Δ | X |
| | XEROX P Paper | ⊙ | ⊙ | ⊙ | ⊙ | ⊙ | ⊙ | ⊙ | ⊙ | X | Δ | X |
| | XEROX 4024 Paper | ⊙ | ⊙ | ⊙ | ⊙ | ⊙ | ⊙ | ⊙ | ⊙ | Δ | ○ | Δ |
| | XEROX 10 Paper | ⊙ | ⊙ | ⊙ | ⊙ | ⊙ | ⊙ | ⊙ | ⊙ | Δ | Δ | Δ |
| | NEENACH BOND Paper | ⊙ | ⊙ | ○ | ⊙ | ⊙ | ⊙ | ⊙ | ⊙ | X | Δ | Δ |
| | RICOPY 6200 Paper | ⊙ | ⊙ | ⊙ | ⊙ | ⊙ | ⊙ | ⊙ | ⊙ | Δ | Δ | Δ |
| | Yamayuri Paper | ⊙ | ⊙ | ○ | ⊙ | ○ | ⊙ | ⊙ | ⊙ | X | X | X |
| | XEROX R Paper | ⊙ | ⊙ | ○ | ⊙ | ○ | ⊙ | ⊙ | ○ | X | X | X |
| | CONQUEROR Paper | ⊙ | ⊙ | ⊙ | ⊙ | ⊙ | ⊙ | ⊙ | ⊙ | X | Δ | X |
| | FAVORIT X Paper | ⊙ | ⊙ | ⊙ | ⊙ | ⊙ | ⊙ | ⊙ | ⊙ | Δ | Δ | Δ |
| | MODO COPY Paper | ⊙ | ⊙ | ⊙ | ⊙ | ⊙ | ⊙ | ⊙ | ⊙ | Δ | Δ | Δ |
| | RAPID COPY Paper | ⊙ | ⊙ | ⊙ | ⊙ | ⊙ | ⊙ | ⊙ | ⊙ | X | Δ | Δ |
| | XEROX P Paper | ⊙ | ⊙ | ⊙ | ⊙ | ⊙ | ⊙ | ⊙ | ⊙ | X | Δ | X |
| | XEROX 4024 Paper | ⊙ | ⊙ | ⊙ | ⊙ | ⊙ | ⊙ | ⊙ | ⊙ | X | X | X |
| | RICOPY 6200 Paper | ⊙ | ⊙ | ⊙ | ⊙ | ⊙ | ⊙ | ⊙ | ⊙ | X | Δ | Δ |
| | Yamayuri Paper | ⊙ | ⊙ | ⊙ | ○ | ⊙ | ○ | ○ | ⊙ | X | X | X |
| | XEROX R Paper | ⊙ | ⊙ | ○ | ⊙ | ○ | ⊙ | ⊙ | ○ | X | X | X |

Evaluation Test B2

The OD values of the prints obtained using the ink compositions of Examples B1 to B8 were measured. Separately, ink compositions were prepared in the same manner as in Examples B1 to B8, except that neither urea nor a urea derivative was added. The OD values of the prints obtained using the ink compositions were measured. The OD ratio was determined by the following formula:

OD ratio=(A/B)×100- 100 wherein

A is OD value when urea or a urea modification product was added, and

B is OD value when neither urea nor a urea modification product was added.

The OD ratios were as follows.

| Examples | OD ratio |
|---|---|
| 1 | 8.8 |
| 2 | 9.7 |
| 3 | 7.7 |
| 4 | 9.2 |
| 5 | 6.5 |
| 6 | 2.3 |
| 7 | 3.2 |
| 8 | 1.5 |

Evaluation Test B3

Figure 3:
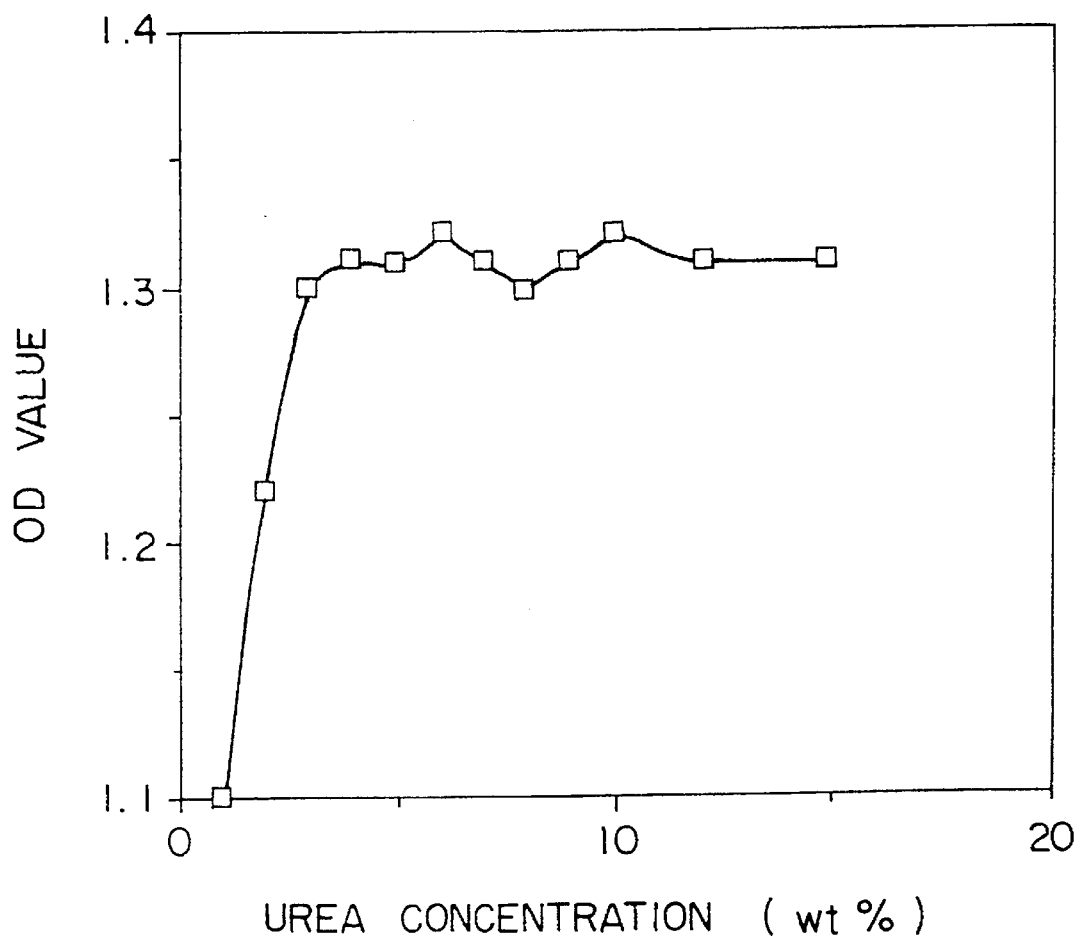
FIG. 3 is a graph showing OD values of prints obtained using ink compositions comprising the same components as the ink composition of Example B1 except that the amount of urea was varied.

In the ink composition of Example B1, the amount of urea added was varied. A change in the total amount of the composition caused by the increase or decrease in the amount of urea add was balanced by water. The OD values of prints obtained using the ink compositions were measured. The results were as shown in FIG. 3.

Example C

Ink compositions of Examples C1 to C8 and ink compositions of Comparative Examples C1 to C3 were prepared by the conventional method.

Example C1

| C.I. Direct black 19 | 2% |
|---|---|
| PGmBE | 10% |
| Triethylene glycol monobutyl ether | 10% |
| 1,4-Butanediol | 2.5% |

-continued

| 1,6-Hexanediol | 2.5% |
|---|---|
| 2-Pyrrolidone | 1.5% |
| Water | Balance |

Example C2

| C.I. Food Black 2 | 2.5% |
|---|---|
| PGmBE | 10% |
| Diethylene glycol mono-n-butyl ether | 10% |
| Dipropylene glycol | 3% |
| Tripropylene glycol | 3% |
| Urea | 5% |
| Water | Balance |

Example C3

| C.I. Acid Green 9 | 2.5% |
|---|---|
| PGmBE | 10% |
| 1-Methyl-1-methoxy butanol | 15% |
| Propylene glycol | 5% |
| Triethylene glycol | 5% |
| 1,5-Pentanediol | 5% |
| Water | Balance |

Example C4

| Special Black SP liquid | 20% |
|---|---|
| DPGmBE | 10% |
| Propylene glycol monoethyl ether | 10% |
| 1,6-Hexanediol | 2% |
| Tripropylene glycol | 3% |
| 1,3-Dimethyl-2-imidazolidinone | 5% |
| Water | Balance |

Example C5

| Direct Special Black AXN | 4% |
|---|---|
| PGmBE | 9% |
| Dipropylene glycol monomethyl ether | 12% |
| 2-Methyl-2,4-pentanediol | 5% |
| 1,2-propanediol | 4% |

-continued

| | |
|---|---|
| N-Methylpyrrolidone | 5% |
| Water | Balance |

Example C6

| | |
|---|---|
| C.I. Reactive Red 6 | 4% |
| PGmBE | 9% |
| DPGmBE | 5% |
| Diethylene glycol mono-n-butyl ether | 15% |
| Neopentyl glycol | 2% |
| 1,3-Butanediol | 2% |
| N-Acylmethyltaurine sodium | 1.5% |
| Water | Balance |

Example C7

| | |
|---|---|
| C.I. Basic Yellow 11 | 5% |
| PGmBE | 10% |
| Triethylene glycol monobutyl ether | 12% |
| Glycerin | 10% |
| Trimethylol propane | 3% |
| Trimethylol ethane | 1% |
| Polypropylene glycol having a number average molecular weight of 400 | 1% |
| Surfynol 465 | 1% |
| Surfynol 104 | 0.5% |
| Water | Balance |

Example C8

| | |
|---|---|
| C.I. Direct Green 1 | 3% |
| C.I. Direct Green 28 | 1% |
| PGmBE | 10% |
| Diethylene glycol mono-t-butyl ether | 5% |
| Diethylene glycol mono-n-butyl ether | 5% |
| Diethylene glycol | 10% |
| Tetrapropylene glycol | 2% |
| 1,3-Propanediol | 5% |
| Water | Balance |

Comparative Example C1

| | |
|---|---|
| C.I. Direct Green 1 | 3% |
| Diethylene glycol mono-n-butyl ether | 5% |
| Ethylene glycol | 15% |
| Potassium hydroxide | 0.1% |
| Water | Balance |

Comparative Example C2

| | |
|---|---|
| C.I. Direct Red 227 | 2.5% |
| Diethylene glycol mono-n-butyl ether | 15% |
| Diethylene glycol | 5% |
| Glycerin | 10% |
| Water | Balance |

Comparative Example C3

| | |
|---|---|
| C.I. Acid Red 254 | 2.5% |
| Diethylene glycol mono-n-butyl ether | 7% |
| Diethylene glycol | 15% |
| Water | Balance |

Evaluation Test C

The above ink compositions were used to carry out printing on various types of recording paper specified in Table 3. The prints thus obtained were evaluated in the same manner as was described in Evaluation Test A1.

The results were as given in Table 3.

TABLE 3

| Test item | Type of paper | Ex. C | | | | | | | | Comp. Ex. C | | |
|---|---|---|---|---|---|---|---|---|---|---|---|---|
| | | 1 | 2 | 3 | 4 | 5 | 6 | 7 | 8 | 1 | 2 | 3 |
| Bleeding | CONQUEROR Paper | ⊚ | ⊚ | ⊚ | ⊚ | ⊚ | ⊚ | ⊚ | ⊚ | ○ | ⊚ | ○ |
| | FAVORIT X Paper | ⊚ | ⊚ | ⊚ | ⊚ | ⊚ | ⊚ | ⊚ | ⊚ | Δ | ○ | ○ |
| | MODO COPY Paper | ⊚ | ⊚ | ○ | ⊚ | ○ | ⊚ | ⊚ | ⊚ | X | Δ | X |
| | RAPID COPY Paper | ⊚ | ⊚ | ⊚ | ⊚ | ⊚ | ⊚ | ⊚ | ⊚ | Δ | ○ | ○ |
| | EPSON EPP Paper | ⊚ | ⊚ | ⊚ | ⊚ | ⊚ | ⊚ | ⊚ | ⊚ | X | Δ | X |
| | XEROX P Paper | ⊚ | ⊚ | ⊚ | ⊚ | ⊚ | ⊚ | ⊚ | ⊚ | X | Δ | X |
| | XEROX 4024 Paper | ⊚ | ⊚ | ⊚ | ⊚ | ⊚ | ⊚ | ⊚ | ⊚ | Δ | ○ | Δ |
| | XEROX 10 Paper | ⊚ | ⊚ | ⊚ | ⊚ | ⊚ | ⊚ | ⊚ | ⊚ | Δ | Δ | Δ |
| | NEENACH BOND Paper | ⊚ | ⊚ | ○ | ⊚ | ○ | ⊚ | ⊚ | ⊚ | X | Δ | Δ |
| | RICOPY 6200 Paper | ⊚ | ⊚ | ⊚ | ⊚ | ⊚ | ⊚ | ⊚ | ⊚ | Δ | Δ | Δ |
| | Yamayuri Paper | ⊚ | ⊚ | ○ | ⊚ | ○ | ⊚ | ⊚ | ⊚ | X | X | X |
| | XEROX R Paper | ⊚ | ⊚ | ○ | ⊚ | ○ | ⊚ | ⊚ | ○ | X | X | X |
| Feathring | CONQUEROR Paper | ⊚ | ⊚ | ⊚ | ⊚ | ⊚ | ⊚ | ⊚ | ⊚ | X | Δ | X |
| | FAVORIT X Paper | ⊚ | ⊚ | ⊚ | ⊚ | ⊚ | ⊚ | ⊚ | ⊚ | Δ | Δ | Δ |
| | MODO COPY Paper | ⊚ | ⊚ | ⊚ | ⊚ | ⊚ | ⊚ | ⊚ | ⊚ | Δ | Δ | Δ |
| | RAPID COPY Paper | ⊚ | ⊚ | ⊚ | ⊚ | ⊚ | ⊚ | ⊚ | ⊚ | X | Δ | Δ |
| | XEROX P Paper | ⊚ | ⊚ | ⊚ | ⊚ | ⊚ | ⊚ | ⊚ | ⊚ | X | Δ | X |
| | XEROX 4024 Paper | ⊚ | ⊚ | ⊚ | ⊚ | ⊚ | ⊚ | ⊚ | ⊚ | X | X | X |
| | RICOPY 6200 Paper | ⊚ | ⊚ | ⊚ | ⊚ | ⊚ | ⊚ | ⊚ | ⊚ | X | Δ | Δ |
| | Yamayuri Paper | ⊚ | ⊚ | ○ | ⊚ | ○ | ○ | ○ | ⊚ | X | X | X |
| | XEROX R Paper | ⊚ | ⊚ | ○ | ⊚ | ○ | ⊚ | ⊚ | ○ | X | X | X |

Example D

The following ink compositions of Examples D1 to D8 and Comparative Examples D1 to D3 were prepared by the conventional method.

Example D1

| C.I. Direct Black 19 | 2% |
|---|---|
| PGmBE | 10% |
| Triethylene glycol monobutyl ether | 10% |
| 1,4-Butanediol | 2.5% |
| 1,6-Hexanediol | 2.5% |
| Thiodiglycol | 5% |
| Water | Balance |

Example D2

| C.I. Food Black 2 | 2.5% |
|---|---|
| PGmBE | 10% |
| Diethylene glycol mono-n-butyl ether | 10% |
| Dipropylene glycol | 3% |
| Thiodiglycol | 3% |
| Urea | 5% |
| Water | Balance |

Example D3

| C.I. Acid Green 9 | 2.5% |
|---|---|
| PGmBE | 10% |
| 1-Methyl-1-methoxy butanol | 15% |
| Propylene glycol | 5% |
| Thiodiglycol | 5% |
| 1,5-Pentanediol | 5% |
| Water | Balance |

Example D4

| Bayscript Black SP liquid | 20% |
|---|---|
| DPGmBE | 10% |
| Propylene glycol monoethyl ether | 10% |
| Thiodiglycol | 12% |
| Tripropylene glycol | 3% |
| 1,3-Dimethyl-2-imidazolidinone | 50% |
| Water | Balance |

Example D5

| Direct Special Black AXN | 4% |
|---|---|
| PGmBE | 9% |
| Dipropylene glycol monomethyl ether | 12% |
| Thiodiglycol | 15% |
| 1,2-Propanediol | 4% |
| N-Methylpyrrolidone | 5% |
| Water | Balance |

Example D6

| C.I. Reactive Red 6 | 4% |
|---|---|
| PGmBE | 9% |
| DPGmBE | 5% |
| Diethylene glycol mono-n-butyl ether | 15% |
| Thiodiglycol | 20% |
| 1,3-Butanediol | 2% |
| N-Acylmethyltaurine sodium | 1.5% |
| Water | Balance |

Example D7

| C.I. Basic Yellow 11 | 5% |
|---|---|
| PGmBE | 10% |
| Triethylene glycol monobutyl ether | 2% |
| Glycerin | 10% |
| Trimethylol propane | 3% |
| Trimethylol ethane | 1% |
| Polyethylene glycol having a number average molecular weight of 400 | 1% |
| Thiodiglycol | 30% |
| Surfynol 465 | 0.5% |
| Water | Balance |

Example D8

| C.I. Direct Green 1 | 3% |
|---|---|
| C.I. Direct Green 28 | 1% |
| PGmBE | 10% |
| Diethylene glycol mono-t-butyl ether | 5% |
| Diethylene glycol mono-n-butyl ether | 5% |
| Diethylene glycol | 10% |
| Thiodiglycol | 0.5% |
| 1,3-Propanediol | 5% |
| Water | Balance |

Comparative Example D1

| C.I. Direct Green 1 | 3% |
|---|---|
| Diethylene glycol mono-n-butyl ether | 5% |
| Ethylene glycol | 15% |
| Potassium hydroxide | 0.1% |
| Water | Balance |

Comparative Example D2

| C.I. Direct Black 154 | 2.5% |
|---|---|
| Diethylene glycol mono-n-butyl ether | 15% |
| Diethylene glycol | 5% |
| Glycerin | 10% |
| Water | Balance |

Comparative Example D3

| C.I. Acid Red 254 | 2.5% |
|---|---|
| Diethylene glycol mono-n-butyl ether | 7% |
| Diethylene glycol | 15% |
| Water | Balance |

Evaluation Test D1

The above ink compositions were used to carry out printing on various types of recording paper specified in Table 4. The prints thus obtained were evaluated in the same manner as was described in Evaluation Test A1.

The results were as given in Table 4.

TABLE 4

| Test item | Type of paper | Ex. D 1 | 2 | 3 | 4 | 5 | 6 | 7 | 8 | Comp. Ex. D 1 | 2 | 3 |
|---|---|---|---|---|---|---|---|---|---|---|---|---|
| Bleeding | CONQUEROR Paper | ⊚ | ⊚ | ⊚ | ⊚ | ⊚ | ⊚ | ⊚ | ⊚ | O | O | O |
|  | FAVORIT X Paper | ⊚ | ⊚ | ⊚ | ⊚ | ⊚ | ⊚ | ⊚ | ⊚ | Δ | O | O |
|  | MODO COPY Paper | ⊚ | ⊚ | O | ⊚ | O | ⊚ | ⊚ | ⊚ | X | Δ | X |
|  | RAPID COPY Paper | ⊚ | ⊚ | ⊚ | ⊚ | ⊚ | ⊚ | ⊚ | ⊚ | Δ | O | O |
|  | EPSON EPP Paper | ⊚ | ⊚ | ⊚ | ⊚ | ⊚ | ⊚ | ⊚ | ⊚ | X | Δ | X |
|  | XEROX P Paper | ⊚ | ⊚ | ⊚ | ⊚ | ⊚ | ⊚ | ⊚ | ⊚ | X | Δ | X |
|  | XEROX 4024 Paper | ⊚ | ⊚ | ⊚ | ⊚ | ⊚ | ⊚ | ⊚ | ⊚ | Δ | O | Δ |
|  | XEROX 10 Paper | ⊚ | ⊚ | ⊚ | ⊚ | ⊚ | ⊚ | ⊚ | ⊚ | Δ | Δ | Δ |
|  | NEENACH BOND Paper | ⊚ | ⊚ | O | ⊚ | O | ⊚ | O | O | X | Δ | Δ |
|  | RICOPY 6200 Paper | ⊚ | ⊚ | ⊚ | ⊚ | ⊚ | ⊚ | ⊚ | ⊚ | Δ | Δ | Δ |
|  | Yamayuri Paper | O | O | O | O | O | O | O | O | X | X | X |
|  | XEROX R Paper | ⊚ | ⊚ | O | ⊚ | O | ⊚ | O | O | X | X | X |
| Feathring | CONQUEROR Paper | ⊚ | ⊚ | ⊚ | ⊚ | ⊚ | ⊚ | ⊚ | ⊚ | X | Δ | X |
|  | FAVORIT X Paper | ⊚ | ⊚ | ⊚ | ⊚ | ⊚ | ⊚ | ⊚ | ⊚ | Δ | Δ | Δ |
|  | MODO COPY Paper | ⊚ | ⊚ | ⊚ | ⊚ | ⊚ | ⊚ | ⊚ | ⊚ | Δ | Δ | Δ |
|  | RAPID COPY Paper | ⊚ | ⊚ | ⊚ | ⊚ | ⊚ | ⊚ | ⊚ | ⊚ | X | Δ | Δ |
|  | XEROX P Paper | ⊚ | ⊚ | ⊚ | ⊚ | ⊚ | ⊚ | ⊚ | ⊚ | X | Δ | X |
|  | XEROX 4024 Paper | ⊚ | ⊚ | ⊚ | ⊚ | ⊚ | ⊚ | ⊚ | ⊚ | X | X | X |
|  | RICOPY 6200 Paper | ⊚ | ⊚ | ⊚ | ⊚ | ⊚ | ⊚ | ⊚ | ⊚ | X | Δ | Δ |
|  | Yamayuri Paper | O | O | O | O | O | O | O | O | X | X | X |
|  | XEROX R Paper | ⊚ | ⊚ | O | ⊚ | O | ⊚ | O | O | X | X | X |

Evaluation Test D2

In the ink composition of Example D1, the thiodiglycol concentration was varied. A change in the total amount of the composition caused by the increase or decrease in the amount of thiodiglycol add was balanced by water. The intermittent printing time for the inks was measured. The results were as shown in FIG. 4.

Example E

The following ink compositions of Examples E1 to E8 and Comparative Examples E1 to E3 were prepared by the conventional method.

The fluorosurfactant used in the following examples and comparative examples was Ftargent 251 (manufactured by Neos Co., Ltd.).

Example E1

| C.I. Direct Black 19 | 2% |
|---|---|
| PGmBE | 10% |
| Triethylene glycol monobutyl ether | 10% |
| 1,4-Butanediol | 2.5% |
| 1,6-Hexanediol | 2.5% |
| Fluorosurfactant | 0.02% |
| Water | Balance |

Example E2

| C.I. Food black 2 | 2.5% |
|---|---|
| PGmBE | 10% |
| Diethylene glycol mono-n-butyl ether | 10% |
| Dipropylene glycol | 3% |
| Fluorosurfactant | 0.03% |
| Urea | 5% |
| Water | Balance |

Example E3

| C.I. Acid Green 9 | 2.5% |
|---|---|
| PGmBE | 10% |
| 1-Methyl-1-methoxy butanol | 15% |
| Propylene glycol | 5% |
| Fluorosurfactant | 0.1% |
| 1,5-Pentanediol | 5% |
| Water | Balance |

Example E4

| Bayscript Black SP liquid | 20% |
|---|---|
| DPGmBE | 10% |
| Propylene glycol monoethyl ether | 10% |
| Fluorosurfactant | 0.2% |
| Tripropylene glycol | 3% |
| 1,3-Dimethyl-2-imidazolidinone | 5% |
| Water | Balance |

Example E5

| Direct Special Black AXN | 4% |
|---|---|
| PGmBE | 9% |
| Dipropylene glycol monomethyl ether | 12% |
| Fluorosurfactant | 1 PPM |
| 1,2-Propanediol | 4% |
| N-Methylpyrrolidone | 5% |
| Water | Balance |

Example E6

| C.I. Reactive Red 6 | 4% |
|---|---|
| PGmBE | 9% |
| DPGmBE | 5% |
| Diethylene glycol mono-n-butyl ether | 15% |
| Fluorosurfactant | 1.0% |
| 1,3-Butanediol | 2% |
| N-Acylmethyltaurine sodium | 1.5% |
| Water | Balance |

Example E7

| C.I. Basic Yellow 11 | 5% |
|---|---|
| PGmBE | 10% |
| Triethylene glycol monobutyl ether | 2% |
| Glycerin | 10% |
| Trimethylol propane | 3% |
| Trimethylol ethane | 1% |

-continued

| | |
|---|---|
| Polyethylene glycol having a number average molecular weight of 400 | 1% |
| Fluorosurfactant | 0.3% |
| Surfynol 465 | 0.5% |
| Water | Balance |

Comparative Example E3

| | |
|---|---|
| C.I. Acid Red 254 | 2.5% |
| Diethylene glycol mono-n-butyl ether | 7% |
| Diethylene glycol | 15% |
| Water | Balance |

Evaluation Test E

The above ink compositions were used to carry out printing on various types of recording paper is specified in Table 5. The prints thus obtained were evaluated in the same manner as was described in Evaluation Test A1.

The results were as given in Table 5.

TABLE 5

| Test item | Type of paper | Ex. E 1 | 2 | 3 | 4 | 5 | 6 | 7 | 8 | Comp. Ex. E 1 | 2 | 3 |
|---|---|---|---|---|---|---|---|---|---|---|---|---|
| Bleeding | CONQUEROR Paper | ⊙ | ⊙ | ⊙ | ⊙ | ⊙ | ⊙ | ⊙ | ⊙ | O | O | O |
| | FAVORIT X Paper | ⊙ | ⊙ | ⊙ | ⊙ | ⊙ | ⊙ | ⊙ | ⊙ | Δ | O | O |
| | MODO COPY Paper | ⊙ | ⊙ | O | ⊙ | O | ⊙ | ⊙ | ⊙ | X | Δ | X |
| | RAPID COPY Paper | ⊙ | ⊙ | ⊙ | ⊙ | ⊙ | ⊙ | ⊙ | ⊙ | Δ | O | O |
| | EPSON EPP Paper | ⊙ | ⊙ | ⊙ | ⊙ | ⊙ | ⊙ | ⊙ | ⊙ | X | Δ | X |
| | XEROX P Paper | ⊙ | ⊙ | ⊙ | ⊙ | ⊙ | ⊙ | ⊙ | ⊙ | X | Δ | X |
| | XEROX 4024 Paper | ⊙ | ⊙ | ⊙ | ⊙ | ⊙ | ⊙ | ⊙ | ⊙ | Δ | O | Δ |
| | XEROX 10 Paper | ⊙ | ⊙ | ⊙ | ⊙ | ⊙ | ⊙ | ⊙ | ⊙ | Δ | Δ | Δ |
| | NEENACH BOND Paper | ⊙ | ⊙ | O | ⊙ | O | ⊙ | O | O | X | Δ | Δ |
| | RICOPY 6200 Paper | ⊙ | ⊙ | ⊙ | ⊙ | ⊙ | ⊙ | ⊙ | ⊙ | Δ | Δ | Δ |
| | Yamayuri Paper | O | O | O | O | O | O | O | O | X | X | X |
| | XEROX R Paper | ⊙ | ⊙ | O | ⊙ | O | ⊙ | ⊙ | O | X | X | X |
| Feathring | CONQUEROR Paper | ⊙ | ⊙ | ⊙ | ⊙ | ⊙ | ⊙ | ⊙ | ⊙ | X | Δ | X |
| | FAVORIT X Paper | ⊙ | ⊙ | ⊙ | ⊙ | ⊙ | ⊙ | ⊙ | ⊙ | Δ | Δ | Δ |
| | MODO COPY Paper | ⊙ | ⊙ | ⊙ | ⊙ | ⊙ | ⊙ | ⊙ | ⊙ | Δ | Δ | Δ |
| | RAPID COPY Paper | ⊙ | ⊙ | ⊙ | ⊙ | ⊙ | ⊙ | ⊙ | ⊙ | X | Δ | Δ |
| | XEROX P Paper | ⊙ | ⊙ | ⊙ | ⊙ | ⊙ | ⊙ | ⊙ | ⊙ | X | Δ | X |
| | XEROX 4024 Paper | ⊙ | ⊙ | ⊙ | ⊙ | ⊙ | ⊙ | ⊙ | ⊙ | X | X | X |
| | RICOPY 6200 Paper | ⊙ | ⊙ | ⊙ | ⊙ | ⊙ | ⊙ | ⊙ | ⊙ | X | Δ | Δ |
| | Yamayuri Paper | O | O | O | O | O | O | O | O | X | X | X |
| | XEROX R Paper | ⊙ | ⊙ | O | ⊙ | O | ⊙ | ⊙ | O | X | X | X |

Example E8

| | |
|---|---|
| C.I. Direct Green 1 | 3% |
| C.I. Direct Green 28 | 1% |
| PGmBE | 10% |
| Diethylene glycol mono-t-butyl ether | 5% |
| Diethylene glycol mono-n-butyl ether | 5% |
| Diethylene glycol | 10% |
| Fluorosurfactant | 0.5% |
| 1,3-Propanediol | 5% |
| Water | Balance |

Comparative Example E1

| | |
|---|---|
| C.I. Direct Green 1 | 3% |
| Diethylene glycol mono-n-butyl ether | 5% |
| Ethylene glycol | 15% |
| Potassium hydroxide | 0.1% |
| Water | Balance |

Comparative Example E2.

| | |
|---|---|
| C.I. Direct Red 154 | 2.5% |
| Diethylene glycol mono-n-butyl ether | 15% |
| Diethylene glycol | 5% |
| Glycerin | 10% |
| Water | Balance |

What is claimed is:

1. An ink composition for ink jet recording, comprising a dye, propylene glycol mono-n-butyl ether (PGmBE) dipropylene glycol mono-n-butyl ether (DPGmBE) or mixtures thereof and a water-soluble glycol ether other than PGmBE and DPGmBE, the total amount of PGmBE and DPGmBE being 3. to 30% by weight based on the ink composition.

2. The ink composition according to claim 1, wherein the total amount of PGmBE and DPGmBE is 3 to 10% by weight based on the ink composition.

3. The ink composition according to claim 1, wherein the water-soluble glycol ether is selected from the group consisting of ethylene glycol monoalkyl ethers, diethylene glycol monoalkyl ethers, triethylene glycol monoalkyl ethers, propylene glycol monoalkyl ethers, dipropylene glycol monoalkyl ethers and alkoxy-substituted aliphatic alcohols.

4. The ink composition according to claim 1, wherein the water-soluble glycol ether is selected from the group consisting of ethylene glycol mono-$C_{1-6}$alkyl ethers, diethylene glycol mono-$C_{1-6}$alkyl ethers, triethylene glycol mono-$C_{1-6}$alkyl ethers, propylene glycol mono-$C_{1-6}$alkyl ethers, dipropylene glycol mono-$C_{1-6}$alkyl ethers and $C_{1-6}$alkoxy-substituted $C_{1-6}$aliphatic alcohol.

5. The ink composition according to claim 1, wherein the ratio of the water-soluble glycol ether to PGmBE and DPGmBE is not less than 0.5.

6. The ink composition according to claim 1, wherein the amount of the water-soluble glycol ether is 5 to 60% by weight based on the ink composition.

7. The ink composition according to claim 1, which further comprises urea, a urea derivative or mixtures thereof.

8. The ink composition according to claim 7, wherein said urea derivative is ethyleneurea, thiourea, biurea, biuret or tetramethylurea.

9. The ink composition according to claim 7, wherein the amount of the urea, urea derivative or mixtures thereof is 2 to 20% by weight based on the ink composition.

10. The ink composition according to claim 1, which further comprises thiodiglycol.

11. The ink composition according to claim 10, wherein the amount of the thiodiglycol is 0.5 to 30% by weight based on the ink composition.

12. The ink composition according to claim 1, which further comprises a surfactant.

13. The ink composition according to claim 12, wherein the surfactant is a fluorosurfactant.

14. The ink composition according to claim 13, wherein the concentration of said fluorosurfactant is 1 to 10,000 ppm.

15. The ink composition according to claim 13, wherein the fluorosurfactant is an amphoteric surfactant or a nonionic surfactant.

16. The ink composition according to claim 1, wherein the foamability of said ink composition as measured by the Ross-Miles method is not more than 200 mm as the initial value and not more than 100 mm 5 min after the initiation of the test.

17. The ink composition according to claim 1, which has a surface tension of 15 to 40 mN/m.

18. The ink composition according to claim 1, wherein the forward contact angle of said ink composition with a nozzle plate of an ink jet recording head is 10° to 50°.

* * * * *